United States Patent

[11] 3,595,988

[72] Inventors Yukio Kawamata; Kozo Yatsushiro, both of Ibaragi, Japan

[21] Appl. No 7,848
[22] Filed Feb. 2, 1970
[45] Patented July 27, 1971

[73] Assignee Matsushita Electric Industrial Co., Ltd. Osaka, Japan

[32] Priority Feb. 6, 1969
[33] Japan
[31] 44/9585

[54] MANUAL HUE AND SATURATION CONTROLS FOR A COLOR TELEVISION RECEIVER
5 Claims, 2 Drawing Figs.

[52] U.S. Cl. .......... 178/5.4 R, 178/5.4 HE
[51] Int. Cl. .......... H04n 9/48
[50] Field of Search .......... 178/5.4 R, 5.4 AC, 5.4 TE, 5.4 HE

[56] References Cited
UNITED STATES PATENTS
2,881,245 4/1959 Fenton et al. .......... 178/5.4 HE

*Primary Examiner*—Robert L. Griffin
*Assistant Examiner*—John C. Martin
*Attorney*—Stevens, Davis, Miller & Mosher

ABSTRACT: A color saturation degree and hue control circuit for color receivers, wherein a semifixed variable resistor for color saturation degree control and a color saturation degree controlling variable resistor which can be controlled by an operator are provided between the output circuit of a first color band-pass amplifier and the input circuit of a second band-pass amplifier, said two resistors being adapted to be changed over by means of a changeover switch, while other two resistors are provided for the purpose of effecting hue control, these two resistors being also adapted to be changed over, thereby controlling hue to proper levels.

Y. KAWAMATA &
K. YATSUSHIRO
INVENTORS

BY Stevens, Davis, Miller & Mosher
ATTORNEYS

MANUAL HUE AND SATURATION CONTROLS FOR A COLOR TELEVISION RECEIVER

This invention relates to a color television receiver.

Figure 1:
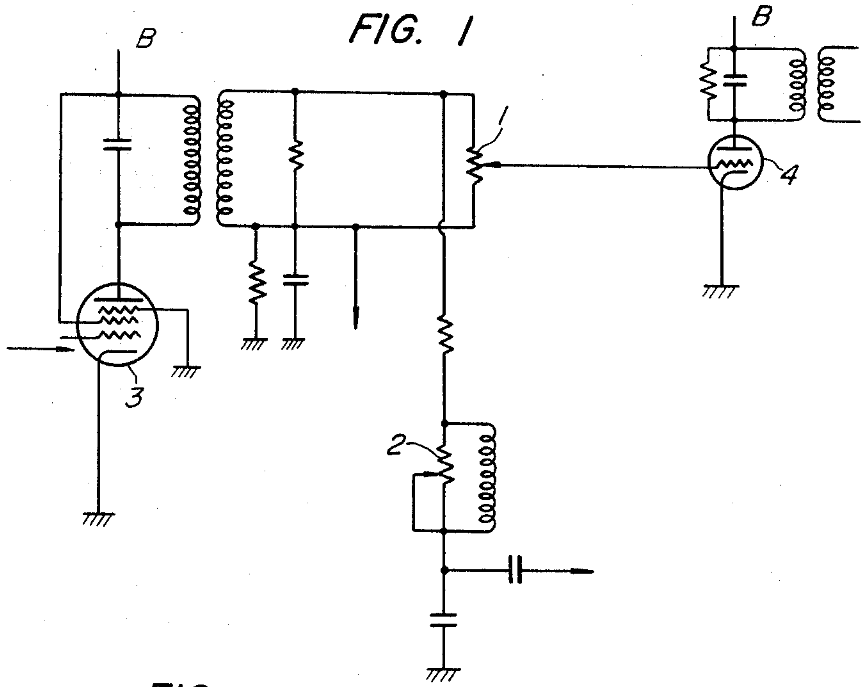

In the presently commercially available color television receivers, the design is made so that the hue and color saturation degree controllers are operated by an operator for the purpose of absorbing irregularities due to differences in each broadcast program and sense of sight of each individual. An example of such conventional circuits is shown in FIG. 1, wherein numeral 1 represents a color saturation degree controlling variable resistor, 2 a hue-controlling variable resistor, 3 a first color band pass amplifier, and 4 a second color band pass amplifier. However, it is very difficult for any operator to adjust the hue controlling variable resistor 2 and color saturation degree controlling resistor 1 while observing colors appearing on the picture tube screen.

Recently, color differences in broadcast programs and performance of the color television receiver have been minimized, and it has also been found that there are relatively little color irregularities depending upon differences in sense of sight between individual television viewers.

Accordingly, it is an object of the present invention to provide color saturation degree and hue controllers with standard points, thereby eliminating the necessity for an operator to control hue and color saturation degree when the program is changed and when they change the broadcast channel.

Figure 2:
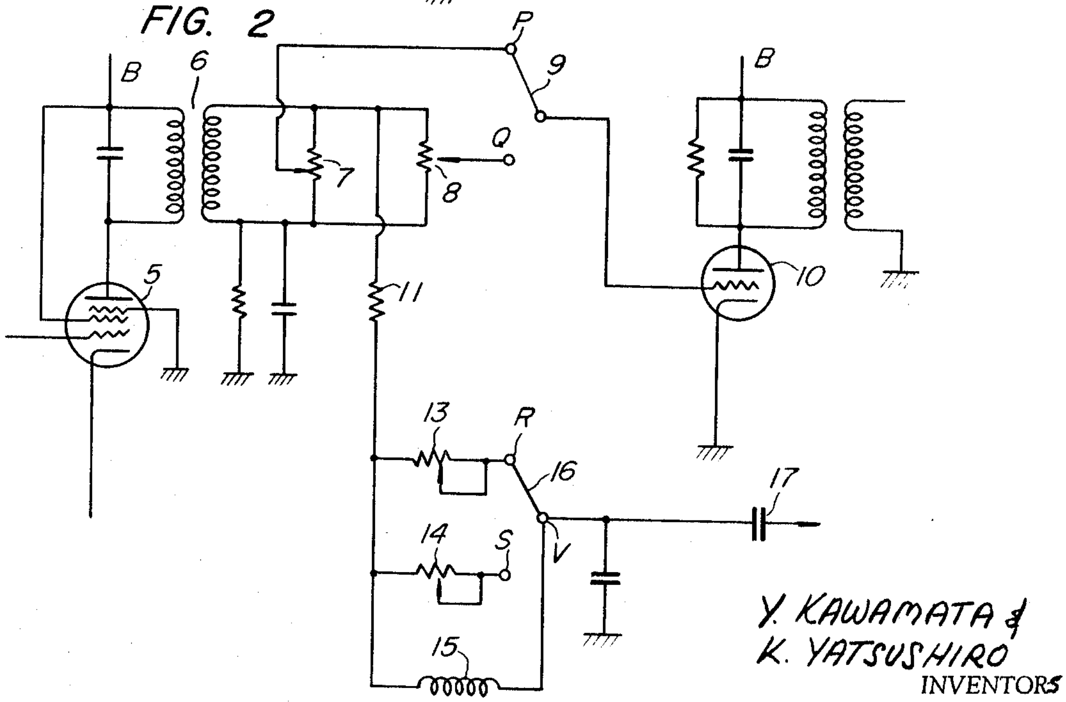

The other objects, features and advantage of this invention will become apparent in the following description taken in conjunction with the accompanying drawings, in which:

FIG. 1 is a circuit diagram of the aforementioned color television receiver; and FIG. 2 is a circuit diagram showing an example of the present invention.

As shown in FIG. 2, an output transformer 6 is connected with the plate of a first band pass amplifier 5, and a parallel circuit of resistors 7 and 8 is connected across the secondary winding of the output transformer 6. These resistors 7 and 8 have their movable terminals connected directly with the fixed terminals P and Q of a changeover switch 9 respectively, the movable terminal L of the changeover switch 9 being connected with the grid of a second band pass amplifier 10.

Further, its secondary winding is connected with each one end of variable resistors 13 and 14 and coil 15 through a resistor 11. The other ends of the variable resistors 13 and 14 are connected with movable terminals thereof respectively and further with the fixed terminals R and S of a changeover switch 6, respectively, the movable terminal V of the changeover switch 16 being connected with the other end of the aforementioned coil 15 and further with a burst gate circuit (not shown) through a capacitor 17.

The variable resistor 7 is a semifixed variable resistor for controlling color saturation degree and which is previously adjusted so that an optimum color saturation degree may be achieved when the switch 9 is positioned at the terminal P side. The variable resistor 13 is a semifixed variable resistor for controlling hue and which is previously set up so that an optimum hue may be achieved when the switch 16 is positioned at the terminal R side. The variable resistors 8 and 14 are color saturation degree and hue-controlling variable resistors similar to those incorporated in the conventional circuits, respectively, the knobs associated with these two resistors being exposed out of the front panel of the receiver cabinet so that they may be controlled by an operator.

Normally, the switches 9 and 16 are positioned at the terminals P and R sides respectively by operator. By doing so, the color saturation degree and hue are previously adjusted so that a substantially satisfactory picture can be reproduced with respect to most broadcasting programs, because at the present technical level, there occur substantially no irregularities in color saturation degree and hue depending upon broadcast program and performance of the receiver per se.

Although very rarely, however, there may be a broadcast program with extremely deviated color saturation degree or hue. Only for such a broadcast program, the switches 9 and 16 are switched to the terminals Q and S sides respectively so that the color saturation and hue are controlled by means of the variable resistors 8 and 14 respectively. When such a broadcast program terminates, the receiver is returned to the original state by switching the switches 9 and 16 by an operator.

As described above, in accordance with the present invention, the operation is extremely simplified because adjustment may be necessary only in special cases, as compared with the conventional arrangement wherein adjustment of color saturation degree and hue should be necessary with respect to each broadcast program.

The aforementioned changeover switches may be either mechanical switching means or electronic switching means using a bistable multivibrator or the like.

What we claim is:

1. A color television receiver comprising an amplifier system for amplifying a color signal, a color saturation degree controlling variable resistor incorporated in said amplifier system, said variable resistor being previously set to a predetermined standard color, at least one color saturation degree controlling variable resistor adapted to be adjusted by an operator and connected in parallel with the first-mentioned resistor, and switching means adapted to select one or the other of said two variable resistors so as to selectively render said amplifier system operative.

2. A color television receiver comprising an amplifier system for amplifying a color signal, a hue-controlling variable resistor provided in said amplifier system, said variable resistor being previously set to a predetermined standard hue, a hue-controlling variable resistor adapted to be adjusted by an operator and connected in parallel with the first-mentioned resistor, and switching means adapted to select one or the other of said two variable resistors so as to selectively render said amplifier system operative.

3. A color television receiver according to claim 1, wherein a hue-controlling variable resistor set to a predetermined standard hue is provided in said amplifier system, a hue-controlling variable resistor adapted to be adjusted by an operator is connected in parallel with the first-mentioned variable resistor, and there is provided additional switching means adapted to be adjusted by an operator is connected in parallel with the first-mentioned variable resistor, and there is provided additional switching means adapted to interlock with said switching means which is adapted to select one or the other of said two color saturation degree variable resistors so as to selectively render said amplifier system operative.

4. A color television receiver according to claim 1, wherein said switching means takes the form of a manual changeover switch, a circuit of said two variable resistors and said changeover switch is provided between the output circuit of a first color band amplifier and a second band pass amplifier.

5. A color television receiver according to claim 2, wherein said switching means takes the form of a manual changeover switch, and a circuit of said two variable resistors and said changeover switch is provided between the output circuit of a first band pass amplifier and a burst gate circuit.